United States Patent
Deshpande et al.

(10) Patent No.: US 10,055,602 B2
(45) Date of Patent: Aug. 21, 2018

(54) SECURELY PROCESSING RANGE PREDICATES ON CLOUD DATABASES

(71) Applicant: International Business Machines Corporation, Armonk, NY (US)

(72) Inventors: Prasad M. Deshpande, Bangalore (IN); Jayant R. Haritsa, Bangalore (IN); Akshar Kaul, Bangalore (IN); Manish Kesarwani, Bangalore (IN); Gagandeep Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 15/132,511

(22) Filed: Apr. 19, 2016

(65) Prior Publication Data

US 2017/0300703 A1    Oct. 19, 2017

(51) Int. Cl.
G06F 21/00 (2013.01)
G06F 21/62 (2013.01)
H04L 9/06 (2006.01)
H04L 9/00 (2006.01)
G06F 21/60 (2013.01)

(52) U.S. Cl.
CPC .......... G06F 21/6218 (2013.01); G06F 21/60 (2013.01); G06F 21/62 (2013.01); H04L 9/002 (2013.01); H04L 9/0618 (2013.01)

(58) Field of Classification Search
CPC . H04L 9/002; H04L 9/008; H04L 9/06; H04L 9/0637; G06F 21/60; G06F 21/602; G06F 21/604; G06F 21/62; G06F 21/6218; G06F 21/6227; G06F 21/6236
See application file for complete search history.

(56) References Cited

U.S. PATENT DOCUMENTS

| 9,087,212 | B2 | 7/2015 | Balakrishnan et al. |
| 2015/0149427 | A1 | 5/2015 | Kerschbaum et al. |
| 2015/0295716 | A1* | 10/2015 | Liu .......... H04L 9/008 713/191 |

OTHER PUBLICATIONS

Kadhem et al., A Secure and Efficient Order Preserving Encryption Scheme for Relational Databases. International Conference on Knowledge Management and Information Sharing, Valencia, Spain, Oct. 25-28, 2010.
SQL Database-Cloud Database as a Service, Microsoft Cloud SQL, Microsoft Azure, 2016.
Cloud SQL, My SQL Relational Data Service, Google Cloud Platform, 2016.
AWS, Amazon Simple DB, Simple Database Services, 2016.
(Continued)

*Primary Examiner* — Edward Zee
(74) *Attorney, Agent, or Firm* — Ryan, Mason & Lewis, LLP (57) ABSTRACT

Methods, systems, and computer program products for securely processing range predicates on cloud databases are provided herein. A computer-implemented method includes separately encrypting a set of plain text data using two or more encryption functions, thereby producing an encrypted domain comprising at least two distinct groups of encrypted data items; converting a range query over plain text data items into a query over at least one of the distinct groups of encrypted data items; and combining results from the query over the distinct groups of encrypted data items, thereby generating a final encrypted result to the range query.

19 Claims, 9 Drawing Sheets

(56) References Cited

OTHER PUBLICATIONS

Craig Gentry, A Fully Homomorphic Encryption Scheme, Sep. 2009.
Rakesh Agrawal, Jerry Kiernan, Ramakrishnan Srikant, and Yirong Xu. Order preserving encryption for numeric data. In Proceedings of the 2004 ACM SIGMOD international conference on Management of data, pp. 563-574. ACM, 2004.
Alexandra Boldyreva, Nathan Chenette, Younho Lee, and Adam O'neill. Order-preserving symmetric encryption. In Advances in Cryptology-EUROCRYPT 2009, pp. 224-241. Springer, 2009.
Alexandra Boldyreva, Nathan Chenette, and Adam O'Neill. Order-preserving encryption revisited: Improved security analysis and alternative solutions. In Advances in Cryptology—CRYPTO 2011, pp. 578-595. Springer, 2011.
Raluca A Popa, Frank H Li, and Nickolai Zeldovich. An ideal-security protocol for order-preserving encoding. In Security and Privacy (SP), 2013 IEEE Symposium on, pp. 463-477. IEEE, 2013.
Jun Xu, Jinliang Fan, Mostafa H Ammar, and Sue B Moon. Prefix-preserving ip address anonymization: Measurement-based security evaluation and a new cryptography-based scheme. In Network Protocols, 2002. Proceedings. 10th IEEE International Conference on, pp. 280-289. IEEE, 2002.
Rui Li, Alex X Liu, Ann L Wang, and Bezawada Bruhadeshwar. Fast range query processing with strong privacy protection for cloud computing. Proceedings of the VLDB Endowment, 7(14):1953-1964, 2014.
Wai Kit Wong, Ben Kao, David Wai Lok Cheung, Rongbin Li, and Siu Ming Yiu. Secure query processing with data interoperability in a cloud database environment. In Proceedings of the 2014 ACM SIGMOD internationalconference on Management of data, pp. 1395-1406. ACM, 2014.
Taher ElGamal. A public key cryptosystem and a signature scheme based on discrete logarithms. In Advances in cryptology, pp. 10-18. Springer, 1985.
Alfred J Menezes, Paul C Van Oorschot, and Scott A Vanstone. Handbook of applied cryptography. CRC press, 1996.
Pascal Paillier. Public-key cryptosystems based on composite degree residuosity classes. In Advances in cryptology-EUROCRYPT'99, pp. 223-238. Springer, 1999.
TPC Benchmark H, (Decision Support) Standard Specification, Revision 2.17.1, 1993-2014.
Arvind Arasu, Spyros Blanas, Ken Eguro, Raghav Kaushik, Donald Kossmann, Ravishankar Ramamurthy, and Ramarathnam Venkatesan. Orthogonal security with cipherbase. In CIDR, 2013.
Sumeet Bajaj and Radu Sion. Trusteddb: A trusted hardware based outsourced database engine. In VLDB, DEMO, 2011.
Mihir Bellare, Thomas Ristenpart, Phillip Rogaway, and Till Stegers. Format-preserving encryption. In Selected Areas in Cryptography, 2009.
Mihir Bellare, Phillip Rogaway, and Terence Spies. The ffx mode of operation for format-preserving encryption. Unpublished NIST proposal, 2010.
Hakan Hacigümü, Bala Iyer, Chen Li, and Sharad Mehrotra. Executing sql over encrypted data in the database-service-provider model. In SIGMOD, 2002.
Bijit Hore, Sharad Mehrotra, and Gene Tsudik. A privacy-preserving index for range queries. In VLDB, 2004.
Jun Li and Edward R Omiecinski. Efficiency and security trade-off in supporting range queries on encrypted databases. In DBSec, 2005.
Raluca Ada Popa, Catherine Redfield, Nickolai Zeldovich, and Hari Balakrishnan. Cryptdb: Processing queries on an encrypted database. In Communications of the ACM, 2012.
Stephen Tu, M Frans Kaashoek, Samuel Madden, and Nickolai Zeldovich. Processing analytical queries over encrypted data. In VLDB, 2013.
Jonathan Katz and Yehuda Lindell. Introduction to modern cryptography. CRC Press, 2008.
IBM, IBM Cloudant, http://www.ibm.com/analytics/us/en/technology/cloud-data-services/cloudant/, Mar. 26, 2016.
Athar Mahbood and Dr. Nassar Ikram 2004 "Transport Layer Security (TLS)—A network Security Protocol for E-commerce" Technocrat PNEC Research Journal, Jan. 2004 http://www.researchgate.net/publication/216485703_Transport_Layer_Security_(TLS)—A_Network_Security_Protocol_for_E-commerce.

* cited by examiner

Algorithm 1 *Range Query Mapping (RQM)*

Input: Range $r$ on plaintext attribute. OPE keys $K_o^1$ and $K_o^2$, PPE keys $K_p^1$ and $K_p^2$, SBC keys $K_s^1$ and $K_s^2$ for $RS$ and $BS$ partition respectively. The number of bits in $RS$ partition i.e. $u$

Output: Set of ranges on $RS$ partition $R_{RS}$, set of ranges on $BS$ partition $R_{BS}$ 1: Convert $r$ into a set of ranges $R$ of form $b_{n-1} b_{n-2} \ldots b_j *$
2: Let $l = n - u$
3: for all $(r_i = b_{n-1} b_{n-2} \ldots b_j *)$ in $R$ do
4:     $v \leftarrow b_{n-1} b_{n-2} \ldots b_j 0 \ldots 0$
5:     $v_u \leftarrow v_{n-1} v_{n-2} \ldots v_l \,;\, v_l \leftarrow v_{l-1} v_{l-2} \ldots v_0$
6:     if $(j < l)$ then {$BS$ range}
7:        $v^* \leftarrow \mathcal{E}_{K_s^2}(v_u) \| v_l$
8:        $e_v^* \leftarrow \mathcal{E}_{K_p^2}(v^*)$
9:     else {$RS$ range}
10:        $e_v^* \leftarrow \mathcal{E}_{K_p^1}(v)$
11:     end if
12:     Let $c_n c_{n-1} \ldots c_0$ be the bit representation of $e_v^*$
13:     $r_L \leftarrow c_{n-1} c_{n-2} \ldots c_j 0 \ldots 0;\; r_U \leftarrow c_n c_{n-1} \ldots c_j 1 \ldots 1$
14:     if $(j < l)$ then
15:        $r_L^* \leftarrow \mathcal{E}_{K_o^2}(r_L)\,;\, r_U^* \leftarrow \mathcal{E}_{K_o^2}(r_U)$
16:        Add $(r_L^*, r_U^*)$ to $R_{BS}$
17:     else
18:        $r_L^* \leftarrow \mathcal{E}_{K_o^1}(r_L)\,;\, r_U^* \leftarrow \mathcal{E}_{K_o^1}(r_U)$
19:        Add $(r_L^*, r_U^*)$ to $R_{RS}$
20:     end if
21: end for
22: return $R_{RS}, R_{BS}$

SECURELY PROCESSING RANGE PREDICATES ON CLOUD DATABASES

FIELD

The present application generally relates to information technology, and, more particularly, to cloud computing technology.

BACKGROUND

Cloud computing has led to the emergence of the database-as-a-service (DBaaS) model for utilizing third-party providers for database services. However, the security of sensitive data hosted in remote locations is a major concern for enterprises looking to leverage the cloud infrastructure. One manner in which entities attempt to overcome this challenge is to encrypt data before uploading the data to the cloud infrastructure. However, encryption may not directly support query processing in the encrypted domain, forcing clients to download and decrypt the entirety of the data for executing any query. The net effect is that the cloud infrastructure is reduced to a mere storage repository, thereby limiting its potential as a data processing engine in its own right.

SUMMARY

In one embodiment of the present invention, techniques for securely processing range predicates on cloud databases are provided. An exemplary computer-implemented method can include steps of separately encrypting a set of plain text data using two or more encryption functions, thereby producing an encrypted domain comprising at least two distinct groups of encrypted data items; converting a range query over plain text data items into a query over at least one of the distinct groups of encrypted data items; and combining results from the query over the distinct groups of encrypted data items, thereby generating a final encrypted result to the range query.

In another embodiment of the invention, an exemplary computer-implemented method can include separately encrypting a table of plain text data using (i) a range safe encryption function and (ii) a brute force safe encryption function, thereby producing an encrypted table comprising (a) one or more columns of a range safe view of encrypted data and (b) one or more columns of a brute force safe view of encrypted data. Such a method can also include storing each column of (i) range safe view of encrypted data and (ii) brute force safe view of encrypted data in a distinct table, removing physical and/or value correlations between the distinct tables, converting a range query from the plain text data into a query over at least one of the distinct tables, and combining results from the query over the distinct tables, thereby generating a final encrypted result to the range query.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes securely processing range predicates on honest-but-active cloud databases. For example, at least one embodiment of the invention includes processing range predicates in structure query language (SQL) queries over an encrypted cloud database (in and/or assuming an honest-but-active adversary model) by splitting a plain text table into multiple encrypted tables. Such an embodiment can include converting a plain text query into multiple queries, wherein each query runs over distinct encrypted tables, and combining the results obtained from the queries to derive the final encrypted result set that can be decrypted (by a security agent, for example).

By way of illustration, in one or more embodiments of the invention, a client submits queries to a security agent which transforms the queries and sends the transformed queries to a service provider. The service provider executes the transformed queries on encrypted data and returns the result set (which includes encrypted data) to the security agent. Subsequently, the security agent decrypts the result set and returns a plain text result set to the client.

As further detailed herein, one or more embodiments of the invention include distinguishing between the upper level and lower level bits of plain text, and encrypting the plain text in separate manners (brute force safe (BS) and range safe (RS), for example). Also, at least one embodiment of the invention includes requiring that there is no correlation between the multiple encryptions of the same plain text value. Accordingly, such an embodiment includes storing the multiple encryptions in different tables and in different and/or random orders.

As noted herein, one or more embodiments of the invention are described within the context of database terminology such as, for example, columns of data, tables (which include multiple columns and multiple rows of data, wherein each row corresponds to data of one entity, wherein each column of the row gives some information about the entity), and databases (which can include a collection of tables).

At least one embodiment of the invention additionally includes utilizing encryption building blocks such as, for example, secure block cipher (SBC), order preserving encryption (OPE), and prefix preserving encryption (PPE). Such embodiments additionally include implementing two new encryption functions based on these building blocks and splitting of plain text bits. By way of illustration, and in such functions:

Plain text data=n bit number, which is conceptually split it into two parts: $M_R$=L least significant bits, and $M_L$=U most significant bits, wherein L+U=n. The first of the two above-noted functions, Enc_BS, is denoted as follows: $E_{OPE\_K2}(E_{PPE\_K2}(E_{SE\_K2}(M_L)\|M_R))$. The second function, Enc_RS, is denoted as follows: $E_{OPE\_K1}(E_{PPE\_K1}(M_L\|E_{SE\_K1}(M_R)))$.

Similarly, at least one embodiment of the invention includes implementing two decryption functions, RS decrypt and BS decrypt. RS decrypt is denoted as follows: $D_{PPE\_K1}(D_{OPE\_K1}(C_{RS}))=M_L\|M_R$, wherein $M=M_L\|D_{SE\_K1}(M_R)$. BS decrypt is denoted as follows: $D_{PPE\_K2}(D_{OPE\_K2}(C_{BS}))=M_L\|M_R$, wherein $M=D_{SE\_K2}(M_L)\|M_R$.

Such functions as detailed above can indicate how a single data item can be encrypted to either a BS or an RS group. Converting a plain text database to an encrypted database is also dependent on the columns being encrypted, such as depicted in the examples illustrated in FIG. 1 and FIG. 2.

Figure 1:
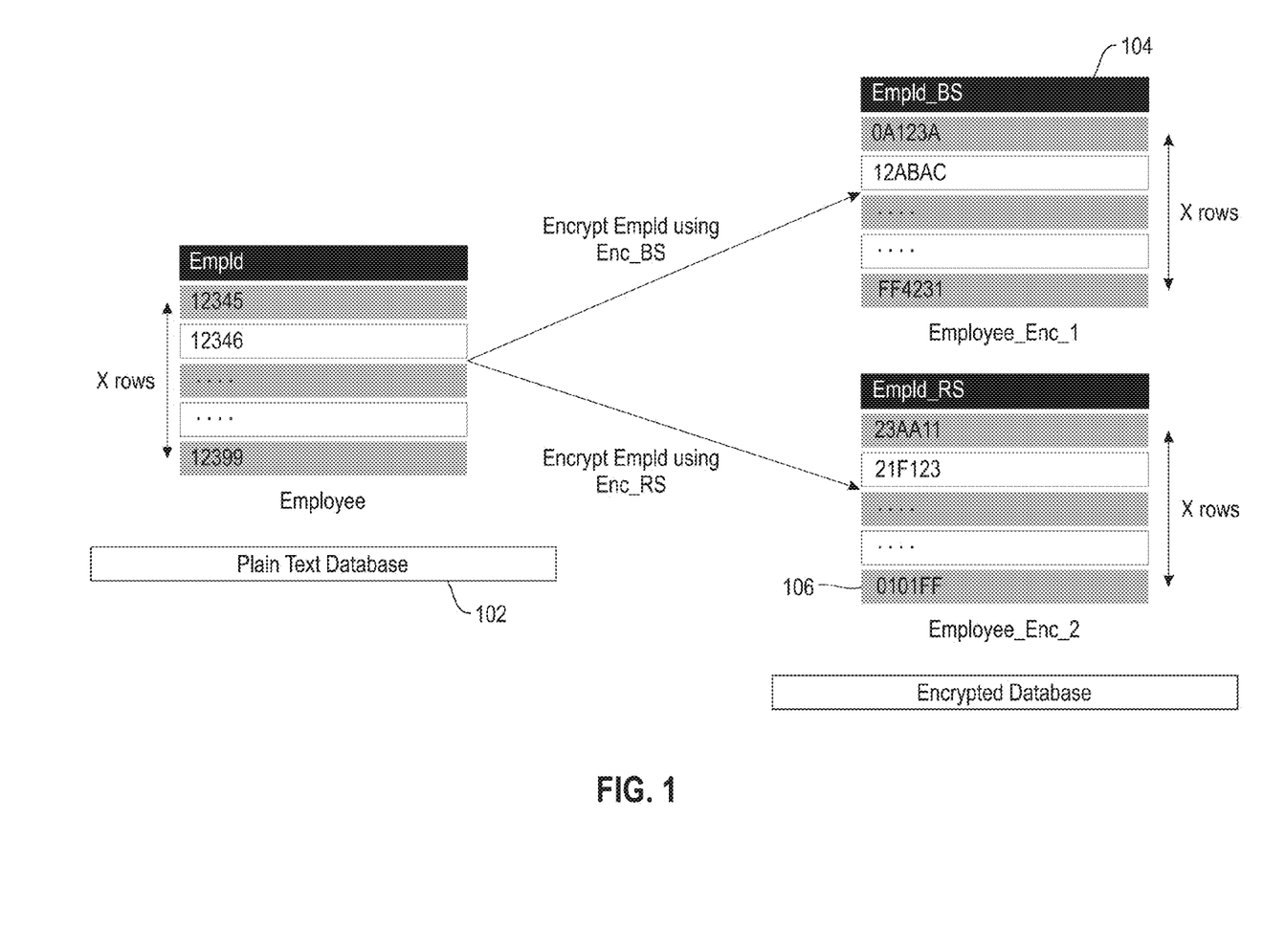
FIG. 1 is a diagram illustrating a single table with a single column, according to an exemplary embodiment of the invention.

FIG. 1 is a diagram illustrating a single table with a single column, according to an exemplary embodiment of the invention. By way of illustration, FIG. 1 depicts a plain text database 102 that includes a table, and an encrypted database that includes tables 104 and 106. As noted, table 104 includes the plain text material from database 102 encrypted using a brute force safe encryption function, and table 106 includes the plain text material from database 102 encrypted using a range safe encryption function.

Figure 2:
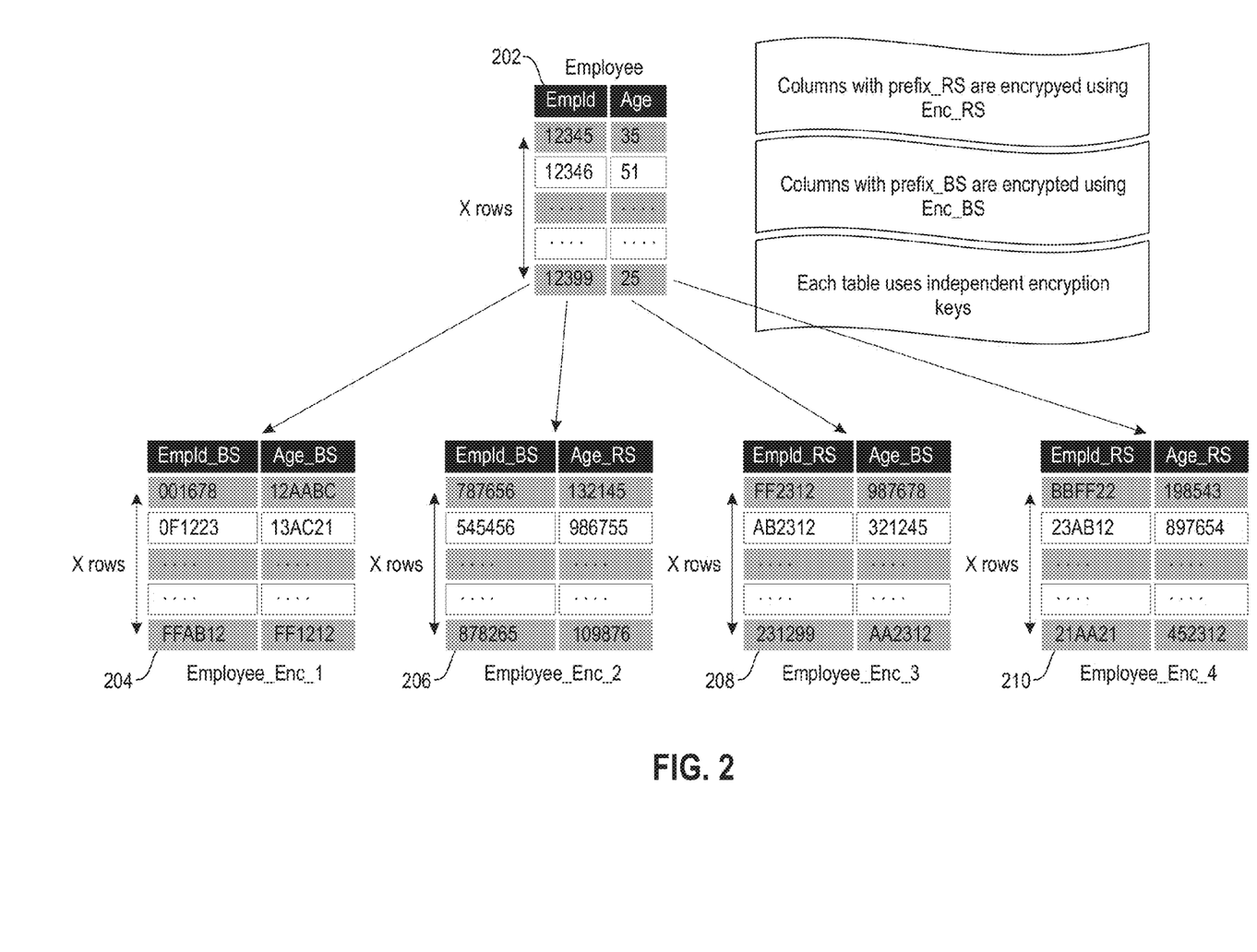
FIG. 2 is a diagram illustrating a single table with two columns, according to an exemplary embodiment of the invention.

FIG. 2 is a diagram illustrating a single table with two columns, according to an exemplary embodiment of the invention. By way of illustration, FIG. 2 depicts table 202 (which includes two columns), and encrypted tables 204, 206, 208 and 210. As also noted in FIG. 2 (and manifested via tables 204, 206, 208 and 210), columns with the prefix "_RS" are encrypted using a range safe encryption function, and columns with the prefix "_BS" are encrypted using a brute force safe encryption function, wherein each table uses independent encryption keys. It is to be appreciated that one or more embodiments of the invention can be extended to encompass additional numbers of columns and/or tables.

Figure 3:
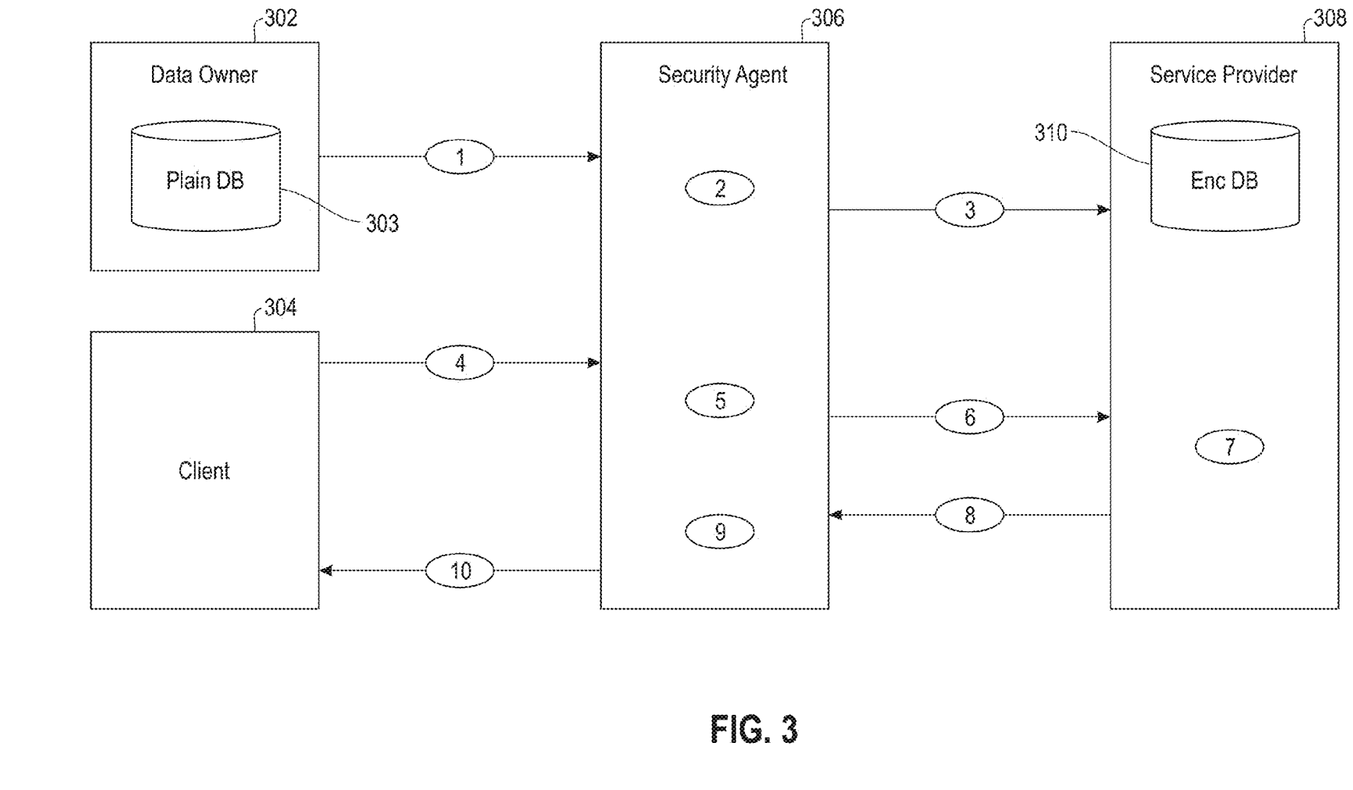
FIG. 3 is a diagram illustrating system architecture, according to an exemplary embodiment of the invention.

FIG. 3 is a diagram illustrating system architecture, according to an embodiment of the invention. By way of illustration, FIG. 3 depicts a data owner 302, which includes a plain text database (DB), a client 304, a security agent 306, and a service provider 308, which includes an encrypted database 310. As further detailed herein, the security agent 306 is a trusted machine hosted by the data owner 302, and all encryption keys are stored by the security agent 306.

As illustrated in FIG. 3, in step 1, the data owner 102 provides the plain text database 303 to the security agent 306. In step 2, the security agent 306 generates and stores encryption keys, and the security agent 306 encrypts the database 303 using these keys to generate the encrypted database 310. In step 3, the security agent 306 transfers the encrypted database 310 to the service provider 308. In step 4, the client 304 generates a plain text query, and the client 304 provides this plain text query to the security agent 306. In step 5, the security agent 306 transforms the query using an algorithm (such as, for example, algorithm 702 depicted in FIG. 7). In step 6, the security agent 306 transfers the transformed query to the service provider 308. In step 7, the service provider 308 executes the transformed query on the encrypted database 310, which generates a result set that includes encrypted data. In step 8, the service provider 308 transfers the encrypted result set to the security agent 306. In step 9, the security agent 306 decrypts the encrypted result set using the (stored) encryption keys, which generates the plain text result set. In step 10, the security agent transfers the plain text result set to the client 304.

Accordingly, one or more embodiments of the invention include implementing a hybrid deterministic encryption scheme that provides security against a host bus adapter (HBA) adversary. While this encryption mechanism ensures removal of value-based correlation between the related parts, position-based correlation across the rows of the tables is prevented by randomizing their physical orderings. At query processing time, each range predicate is rewritten into an equivalent set of table-specific sub-range predicates, and the disjoint union of their results forms the query answer.

As noted above (and as further used herein), OPE refers to a deterministic encryption scheme that preserves the numerical ordering of plain text in the encrypted domain. Therefore, the transformation of a plain text range query to the corresponding ciphertext query includes the encrypted values of the endpoints of the plain text range forming the end-points of the ciphertext range. Additionally, PPE, as used herein, refers to a scheme which constrains the ciphertexts of prefix-related plain text values to retain the relationship.

Additionally, at least one embodiment of the invention includes implementing an encryption scheme that achieves range predicate security (RPS) against a binary search attack (BSA) by breaking a chain of queries. For example, given a plain text domain of size N, the RPS requirement can include a requirement that data values should not be leaked within an interval of size H on this domain. Also, as detailed herein, such an encryption scheme includes splitting each n bit range-sensitive value into a pair of contiguous parts, (i) an upper segment of length u bits and (ii) a lower segment of length l bits, such that u+l=n. By way merely of example, assume that there are d range-sensitive columns in the database with contents that need to be maintained securely. In this example, the two parts are each independently encrypted $2^{d-1}$ times, and the encryption can be carried out using a layered composition of an SBC with the PPE and OPE schemes to produce $2^d$ derived ciphertexts corresponding to the original plain text. Each of these ciphertexts is then stored in a separate ciphertext table.

Also, by way of further example, the security of an encryption scheme can be quantified in terms of a security parameter, denoted herein by λ, which can correspond to the bit lengths of the plain text values, which are denoted by n. Additional notations used herein can include the following:

x[p . . . q] denotes extraction of bits p through q from the (big-endian) binary representation of x;

$x_1 \| \ldots \| x_k$ denotes the concatenation of bits $x_1, \ldots, x_k$, from which each $x_i$ is uniquely recoverable;

for a set S, $$x \xleftarrow{\$} S$$

denotes that x is selected uniformly at random from set S, and |x| denotes its length in bits;

P denotes the plain text domain, and R denotes the ciphertext domain;

$$[x]_m \xleftarrow{\$} P$$

denotes a set of m plain texts that are selected uniformly at random from the domain P;

N denotes the size of the plain text domain, $n = \log_2(N)$, and H denotes the RPS interval constraint size specified by the data owner (DO, wherein H is assumed to lie in the interval $[1, \sqrt{N}]$, and also, $$\psi = \frac{N}{H});$$

and given any plain text value x, its encrypted version is denoted by x*.

As detailed herein, at least one embodiment of the invention includes implementing an encryption scheme that includes splitting every n bit plain text into two parts, an upper (most significant) u bits and a lower (least significant) l bits, such that u+l=n. These two parts are then encrypted separately with independently generated keys to produce two ciphertexts, and these two ciphertexts are stored in two different tables at a server. Additionally, such an encryption scheme includes removing any physical and/or value correlation between the two tables. Also, in one example embodiment, any range query on the plain text table is converted into two ciphertext queries (one over each of the two ciphertext tables), and the disjoint union of the result from the two ciphertext queries comprises the final result which can then be decrypted and forwarded to the query client (QC). Additionally, in one or more alternate embodiments of the invention, a transformed query may be over only one table/group. Therefore, a minimum value can be one table/group while a maximum value can include all tables/groups, depending upon the query.

Figure 4:
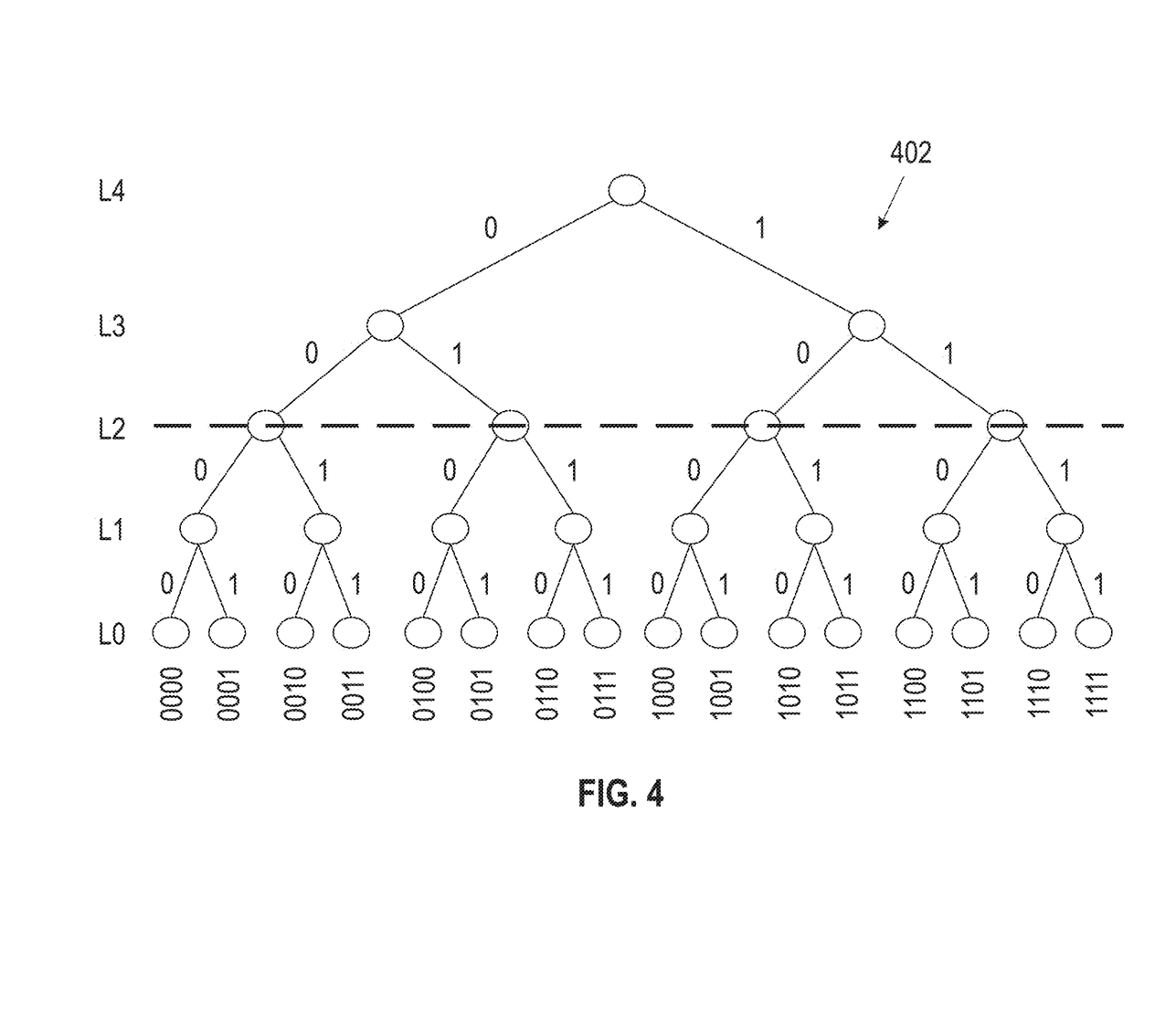
FIG. 4 is a diagram illustrating a portion of an encryption scheme, according to an exemplary embodiment of the invention.

FIG. 4 is a diagram illustrating a portion of an encryption scheme, according to an exemplary embodiment of the invention. By way of illustration, FIG. 4 depicts a set of plain texts (that can take any n-bit value) represented by a binary tree 402 of height n, also referred to herein as the plain text tree (PT). The leaf level containing $2^n$ nodes is denoted as L0, the level above this leaf level is denoted as L1, and so on. For example, in the plain text tree 402 for 4-bit integers shown in FIG. 4, n is 4 and the PT 402 contains nodes at five different levels (L0 to L4). Every node in the leaf level of the PT can be associated with n-bits of information, depending upon the node's path from the root to level L0. For example, each leaf node in the FIG. 4 PT 402 can be associated with 4-bits of information.

Additionally, at least one embodiment of the invention includes dividing the levels of the PT into two contiguous partitions: (i) an RS partition and (ii) a BS partition. The RS partition includes a set of contiguous top levels of the PT. For example, in FIG. 4, levels L2 through L4 can belong to the RS partition. In one of the encrypted tables, referred to as the RS table, the bits in the RS partition are encrypted for range query processing, and the remaining bits are blinded (encrypted) using a SBC. Accordingly, in the above-noted example, nodes at level L2 will serve as leaf nodes and the associated range for every such node is of $2^2$ integers granularity, as shown in FIG. 5.

Figure 5:
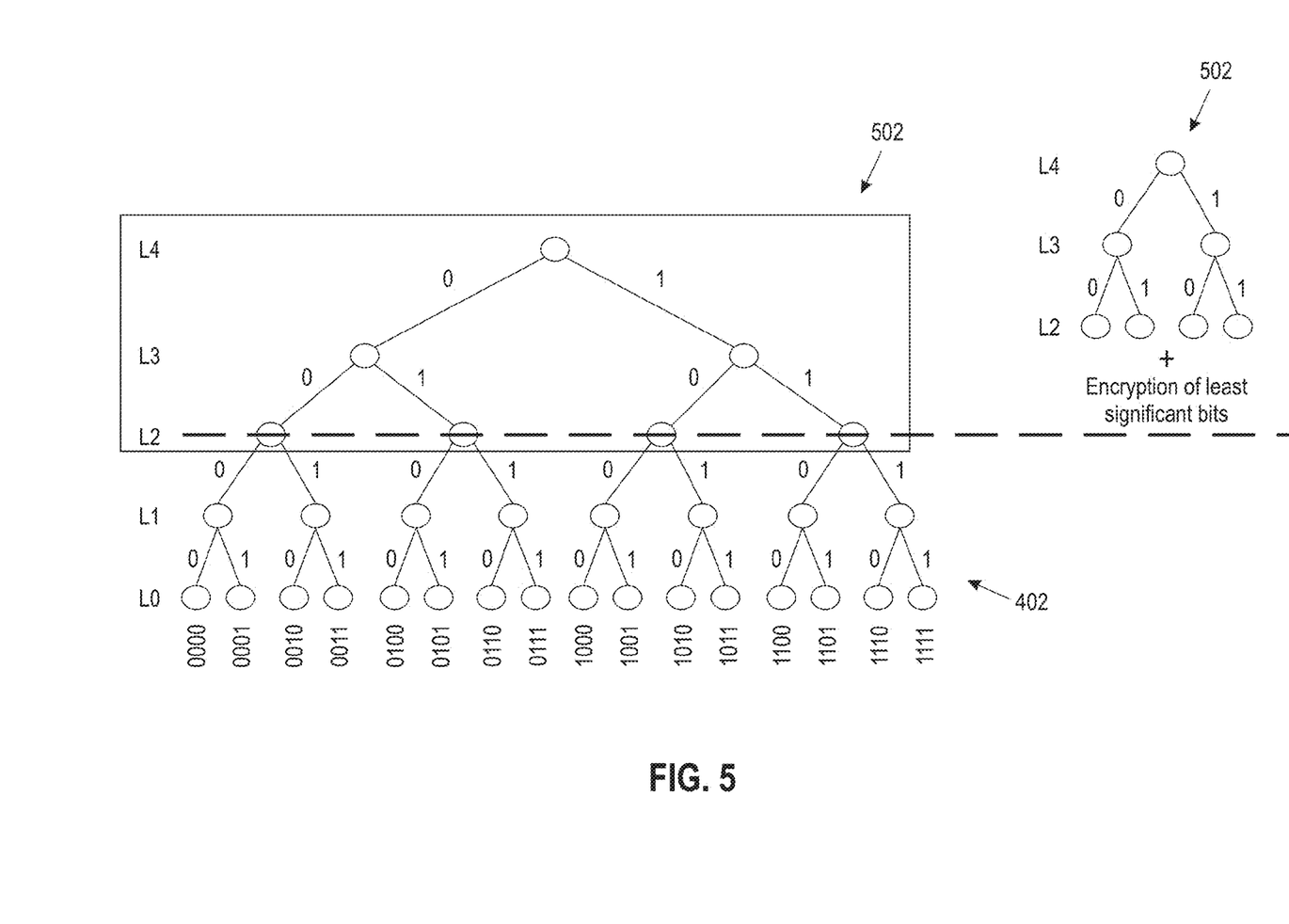
FIG. 5 is a diagram illustrating a portion of an encryption scheme, according to an exemplary embodiment of the invention.

FIG. 5 is a diagram illustrating a portion of an encryption scheme, according to an exemplary embodiment of the invention. By way of illustration, FIG. 5 highlights the upper levels 502 of nodes (that is, the nodes of L2 through L4) of PT 402, representing the RS partition. Further, the above-noted encrypted table can be used to answer range queries of the form ab or a*, wherein a and b are bits taking values 0 or 1. Any HBA adversary attempting to mount a chosen range attack (CRA; that is, an attack to attempt to gain information which reduces the security of the encryption scheme) against this part (502) of the tree 402 will not be able to decrypt the lower bits blinded using SBC, and as such, can only identify the encrypted values at a coarse granularity (of $2^2$ in this example). If this partition (502) contains a small number of levels of the PT 402, such that the leaf granularity is greater than or equal to H, then the partition 502 can be considered secure because it is not possible for the adversary to infer a plain text value in an interval of granularity finer than H.

Figure 6:
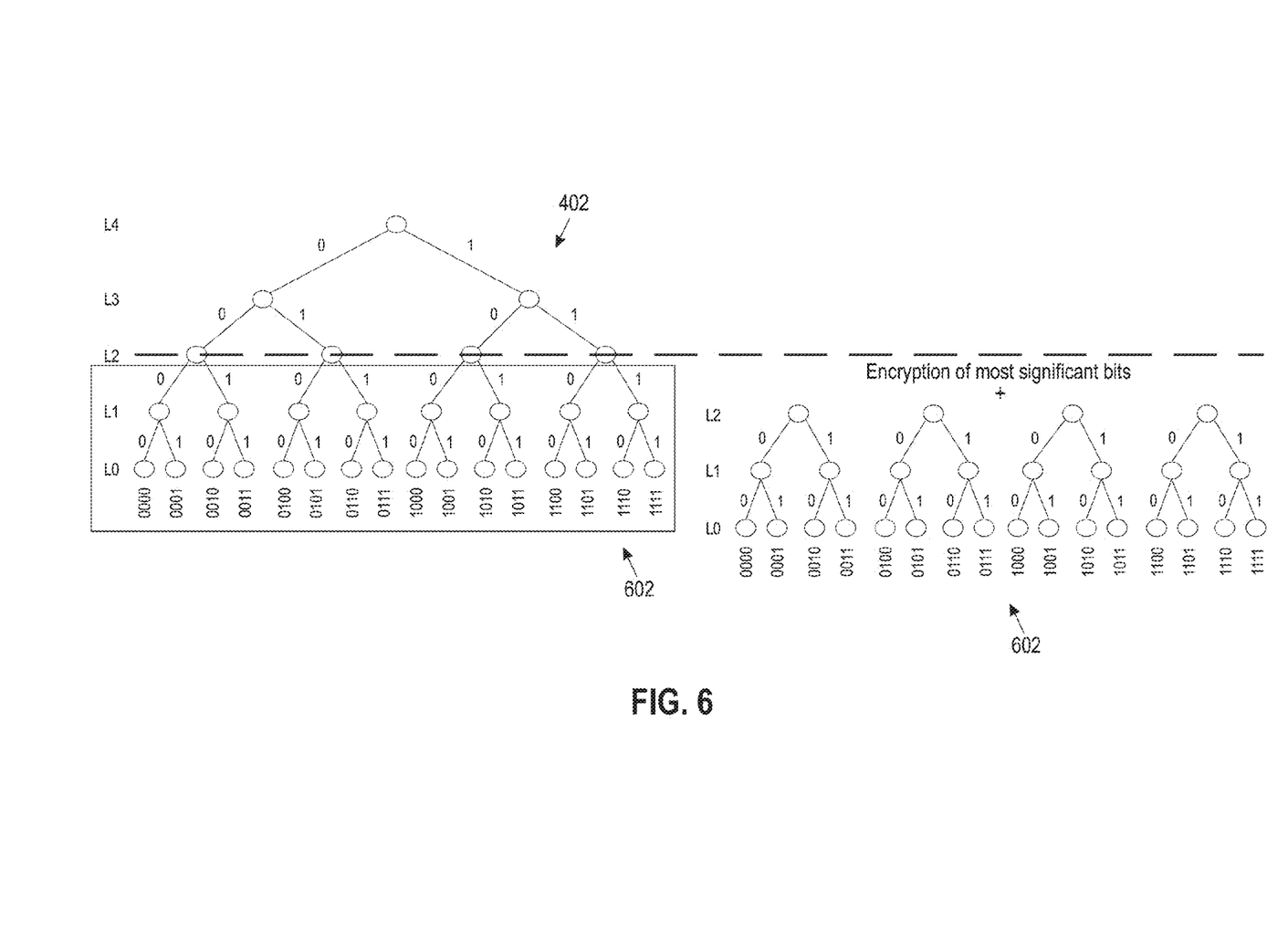
FIG. 6 is a diagram illustrating a portion of an encryption scheme, according to an exemplary embodiment of the invention.

FIG. 6 is a diagram illustrating a portion of an encryption scheme, according to an exemplary embodiment of the invention. By way of illustration, FIG. 6 highlights the remaining/lower levels 602 of nodes (that is, the nodes of L0 up to the level where the RS partition ends (L2)) of PT 602. Referring again to the above-noted example, in the other encrypted table (referred to herein as the BS table), the bits in the BS partition 602 are encrypted for range query processing while the higher order bits (in partition 502) are blinded using SBC. This represents a set of trees with the prefixes blinded, as shown in FIG. 6. This encrypted table can be used to answer finer-grained range queries of the form xyab and xya*, wherein x, y, a and b are bits taking values 0 or 1. An HBA adversary can attempt to perform a binary search in this encrypted table, provided that the adversary knows the upper level bits (which are encrypted using a SBC). However to identify the upper level bits of the chosen ciphertext, the adversary will potentially have to mount a brute force search to find the sub-tree containing the target ciphertext. In the above-noted example, the adversary would have to issue queries over all of the nodes at level L2. If the number of upper bits encrypted under SBC are sufficiently large, then this partition can be considered secure because a large number of brute force queries (super-polynomial in λ) are required to break it.

As described herein, the splitting of a plain text query can be based on the ranges encoded in the two encrypted tables. For example, if the range predicate in the plain text query is [2, 7], then the query will be split into two ranges: [2, 3] and [4, 7]. The first range ([2, 3]) will be queried from the encrypted table containing the BS partition and the second range ([4, 7]) will be queried from the encrypted table containing the RS partition. It should be noted, however, that the above-noted querying arrangement is merely an example, and is not the only arrangement that can be embodied and/or utilized via the techniques detailed herein. The identified ranges in an encrypted domain can be put into any possible arrangement. Also, in one or more embodiments of the invention, there may be a query only on one encrypted table and not on another. For example, if a plain text range was [2, 3], then the query can be converted to a range on the BS table only, and no range on the RS table will be needed.

Because there is no physical or value correlation between the tuples in the BS and RS tables, the adversary cannot infer a chosen ciphertext in the RS table to a range finer than H, and also is not able to direct a binary search to a chosen ciphertext in the BS table without using a brute force search.

By way of example, consider a scenario wherein it is desired to support d dimensional range predicates on a plain text table that has d columns. Each of the d columns will be split into two parts (BS and RS), and each part will be independently encrypted $2^{d-1}$ times, thus creating $2^d$ ciphertext columns corresponding to each plain text column. Further, $2^d$ encrypted tables will be created capturing all BS and RS combinations of these dimensions. For example, one of the tables will store the BS partitions of all d dimensions, another will store the BS partition of the first d−1 dimensions along with the RS partition of the $d^{th}$ dimension, and so on. If there are some columns in the plain text table on which range predicate queries are not needed, these columns can be encrypted using a SBC.

In a multi-dimensional case, there can be multiple encrypted tables containing the BS and RS encryption of the same plain text column. Accordingly, one or more embodiments of the invention includes ensuring that there is no correlation between the tuples in these encrypted tables (for example, via using different keys for the two tables). At least one embodiment of the invention can include combining OPE with PPE to ensure that there is no correlation when the same value is encrypted using different keys.

In one or more embodiments of the invention, the number of levels in BS and/or RS partitions is a configurable parameter for every column on which a range predicate query can occur, and such a parameter can be set based on the application requirements. By way merely of illustration, in a banking example, a security requirement may exist that an amount in any account must not be revealed to an interval of size 1000000. Such action will help in setting the parameters such that this constraint is fulfilled. By way of additional example, if the data owner has defined the RPS constraint to be H, the number of bits in the BS partition can be set to $l=\lceil \log_2(H) \rceil$, and the number of bits in RS partition can be set to u=n−l. A binary search over the RS table can reveal a value at the granularity of size $2^l \geq H$, and to decrypt a value from the BS table, an adversary has to make $O(2^{n-l})=O(\psi)$ brute force queries. Note that in an example embodiment of the invention, fixing number of bits in the RS partition as u fixes the number of bits in the BS partition as l=n−u.

The techniques detailed herein include enabling processing of range queries on encrypted data using a combination of prefix-preserving encryption, order-preserving encryption and/or secure block cipher such as advanced encryption standard (AES). Key generation can include generating a number of keys that is dependent on the number of columns being encrypted. For example, such keys can include the following: $OPE_{K1}$, $OPE_{K2}$, $PPE_{K1}$, $PPE_{K2}$, $SE_{K1}$ and $SE_{K2}$. Encrypting an RS cipher can include $E_{OPE\_K1}(E_{PPE\_K1}(M_L \| E_{SE\_K1}(M_R)))$, while encrypting a BS cipher can include $E_{OPE\_K2}(E_{PPE\_K2}(E_{SE\_K2}(M_L)\|M_R))$. Additionally, RS decryption can include $D_{PPE\_K1}(D_{OPE\_K1}(C_{RS}))=M_L\|M_R$, wherein $M=M_L\|D_{SE\_K1}(M_R)$. Also, BS decryption can include $D_{PPE\_K2}(D_{OPE\_K2}(C_{BS}))=M_L\|M_R$, wherein $M=D_{SE\_K2}(M_L)\|M_R$.

Figure 7:
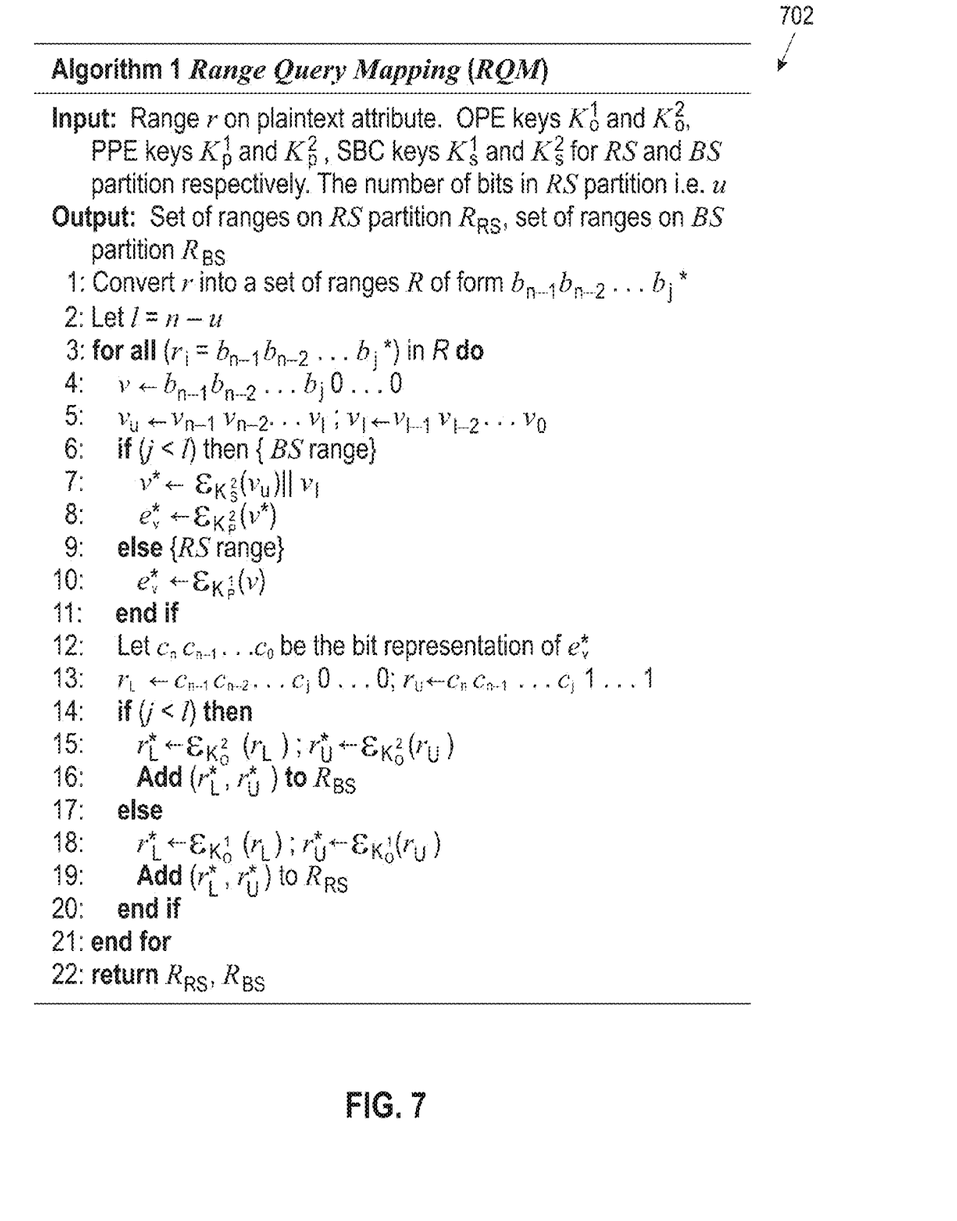
FIG. 7 is a diagram illustrating a range query mapping algorithm, according to an exemplary embodiment of the invention.

FIG. 7 is a diagram illustrating a range query mapping algorithm 702, according to an exemplary embodiment of the invention. Specifically, algorithm 702 maps range predicates on a plain text domain to RS and BS partitions. The algorithm 702 starts by converting the input range r into a set of ranges R represented by prefixes (Line 1). The maximum number of such ranges can be 2*(n−1), wherein n is the number of bits used for representing the attribute values. For each prefix in R, a value with that prefix is chosen. Any value can be chosen, and in algorithm 702, a value is chosen by setting the unspecified bits to 0 (Line 4). Then, depending on the size of the range represented by the prefix, the range is mapped to either the RS partition or the BS partition. For a BS range, the higher order bits are encrypted with the SBC (Line 7), and the value is then encrypted with PPE encryption (lines 8, 10). The lower and upper bounds of the range in the PPE encrypted domain can be computed by replacing the lower j bits with all 0s and all 1s, respectively (Line 12-13). Note that, in this example embodiment, the lower j bits of the encrypted value do not matter because the original range was specified with the upper n-j bits. Finally, these lower and upper bits are further encrypted using OPE encryption with the appropriate keys, and the range is added to $R_{BS}$ or $R_{RS}$, depending on the size of the range (Line 14-20).

Due to the prefix-preserving property of PPE and order preserving property of OPE, this mapping produces the correct range on the encrypted domain. This algorithm (702) shows the range mapping for a single dimension. If there are ranges on multiple dimensions, each range will be split into prefixes, and the set of all combinations of prefixes will together represent the full range of the original query. Each combination will be answered from the table corresponding to the range types. For example, a BS range on one dimension combined with a BS range on the second dimension will be answered from the BS_BS table. The keys corresponding to those tables are used in transforming the values in the algorithm.

As detailed herein, one or more embodiments of the invention can include the following steps. A client sends a plain text query to an entity such as, for example, a security agent, which acts as the bridge connecting the data owner and client QC with the service provider. The security agent calls algorithm 702 (as depicted in FIG. 7) and identifies the sub-ranges over ciphertext tables. The security agent computes the ciphertext range queries using the output of algorithm 702, and these queries are then sent to the service provider. The service provider executes these queries and sends the count of tuples in each query to the security agent. If instead of the count, entire tuples of the tables are requested by the client, then the service provider would return encrypted tuples to the security agent as a result of query evaluation. The security agent adds the counts received from each query and sends the final result back to the client. If instead of the count, the security agent had received encrypted tuples as the query result from the service provider, then the security agent would decrypt individual tuples and take the union of the tuples returned from each query.

Note that the security agent is able to perform the addition of counts or the union of tuples from various queries because these queries access disjoint set of tuples from the encrypted tables.

Figure 8:
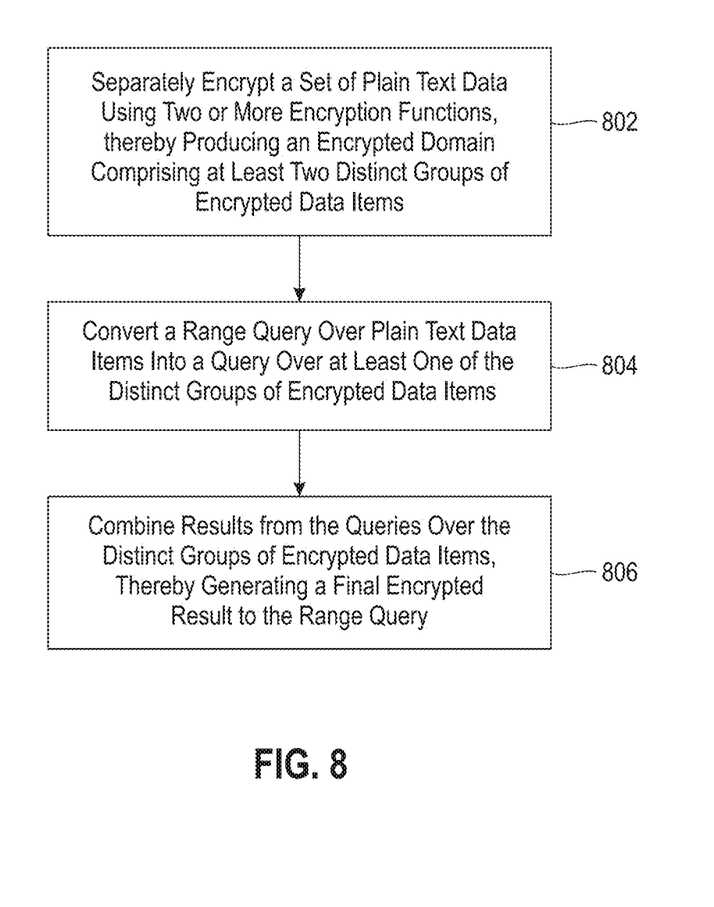
FIG. 8 is a flow diagram illustrating techniques according to an embodiment of the invention.

FIG. 8 is a flow diagram illustrating techniques according to an embodiment of the present invention. Step 802 separately encrypting a set of plain text data using two or more encryption functions, thereby producing an encrypted domain comprising at least two distinct groups of encrypted data items. The set of plain text data can include a table of plain text data. The at least two distinct groups of encrypted data items can include at least two distinct encrypted tables, at least two ciphertexts, and/or can include a specific number of distinct groups of encrypted data that is dependent on the number of columns in the set of plain text data.

As detailed herein, in at least one embodiment of the invention, the two or more encryption functions can include (i) a brute force safe function and (ii) a range safe function, and the at least two distinct groups of encrypted data items can include (i) a range safe view of encrypted data items and (ii) a brute force safe view of encrypted data items.

Additionally, separately encrypting can include using a distinct combination of (i) prefix-preserving encryption, (ii) order-preserving encryption and/or (iii) secure block cipher to encrypt the set of plain text data. Also, separately encrypting can include using an independently generated key to encrypt the set of plain text data.

Step 804 includes converting a range query over plain text data items into a query over at least one of the distinct groups of encrypted data items. Converting can include mapping an input range from the set of plain text data to a set of multiple sub-ranges over the encrypted domain that can be evaluated over the at least two distinct groups of encrypted data items. Additionally, converting can include converting the range query from the set of plain text data into (i) a range safe query and (ii) a brute force safe query.

Step 806 includes combining results from the query over the distinct groups of encrypted data items, thereby generating a final encrypted result to the range query. Combining can include performing a disjoint union operation on a set of results from the query over the least two distinct groups of encrypted data items.

Also, the techniques depicted in FIG. 8 can additionally include decrypting the final encrypted result, thereby generating a plain text result set, and outputting the plain text result set to a client that provided the plain text range query.

Also, an additional embodiment of the invention includes separately encrypting a table of plain text data using (i) a range safe encryption function and (ii) a brute force safe encryption function, thereby producing an encrypted table comprising (a) one or more columns of a range safe view of encrypted data and (b) one or more columns of a brute force safe view of encrypted data. Such an embodiment can also include storing each column of (i) range safe view of encrypted data and (ii) brute force safe view of encrypted data in a distinct table, removing physical and/or value correlations between the distinct tables, converting a range query from the plain text data into a query over at least one of the distinct tables, and combining results from the query over the distinct tables, thereby generating a final encrypted result to the range query.

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 9:
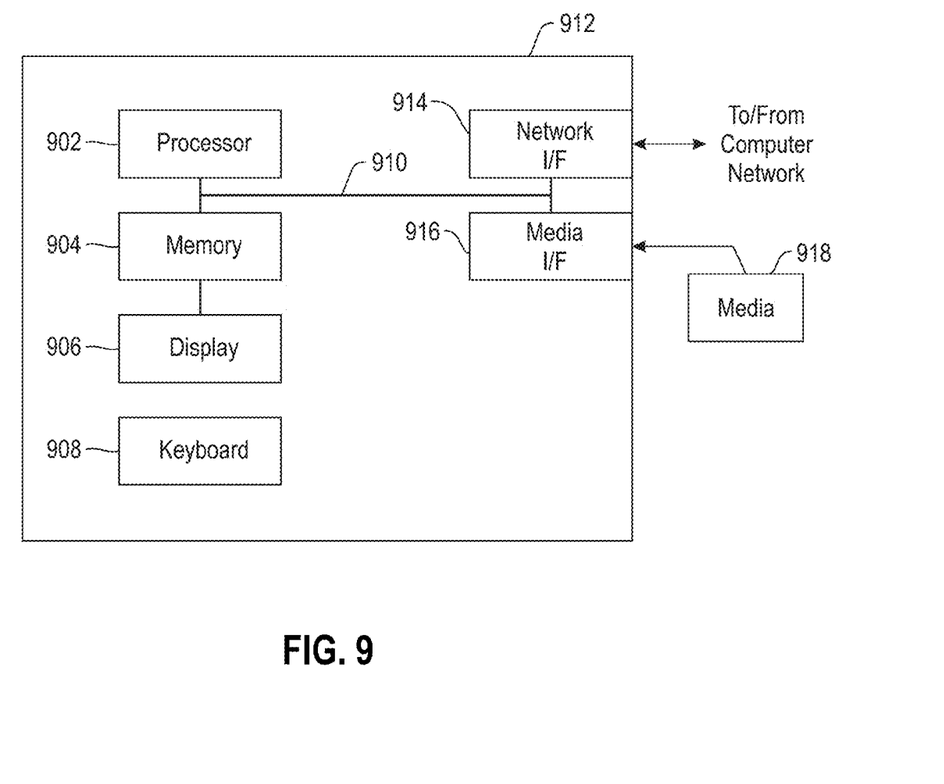
FIG. 9 is a system diagram of an exemplary computer system on which at least one embodiment of the invention can be implemented.

Additionally, an embodiment of the present invention can make use of software running on a computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, splitting data bits and encrypting the data bits in brute-force safe and range-safe views.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
    separately encrypting a set of plain text data using two or more encryption functions, thereby producing an encrypted domain comprising at least two distinct groups of encrypted data items, wherein the two or more encryption functions comprise (i) a brute force safe function and (ii) a range safe function;
    converting a range query over plain text data items into a query over at least one of the distinct groups of encrypted data items; and
    combining results from the query over the distinct groups of encrypted data items, thereby generating a final encrypted result to the range query;
    wherein the steps are carried out by at least one computing device.

2. The computer-implemented method of claim 1, wherein the set of plain text data comprises a table of plain text data.

3. The computer-implemented method of claim 1, wherein the at least two distinct groups of encrypted data items comprise at least two distinct encrypted tables.

4. The computer-implemented method of claim 1, wherein the at least two distinct groups of encrypted data items comprise a specific number of distinct groups of encrypted data that is dependent on the number of columns in the set of plain text data.

5. The computer-implemented method of claim 1, wherein the at least two distinct groups of encrypted data items comprise at least two ciphertexts.

6. The computer-implemented method of claim 1, wherein the at least two distinct groups of encrypted data items comprise (i) a range safe view of encrypted data items and (ii) a brute force safe view of encrypted data items.

7. The computer-implemented method of claim 1, wherein said separately encrypting comprises using a distinct combination of (i) prefix-preserving encryption, (ii) order-preserving encryption and/or (iii) secure block cipher to encrypt the set of plain text data.

8. The computer-implemented method of claim 1, wherein said separately encrypting comprises using an independently generated key to encrypt the set of plain text data.

9. The computer-implemented method of claim 1, wherein said converting comprises mapping an input range from the set of plain text data to a set of multiple sub-ranges over the encrypted domain that can be evaluated over the at least two distinct groups of encrypted data items.

10. The computer-implemented method of claim 1, wherein said converting comprises converting the range query from the set of plain text data into (i) a range safe query and (ii) a brute force safe query.

11. The computer-implemented method of claim 1, wherein said combining comprises performing a disjoint union operation on a set of results from the query over the least two distinct groups of encrypted data items.

12. The computer-implemented method of claim 1, comprising:
    decrypting the final encrypted result, thereby generating a plain text result set.

13. The computer-implemented method of claim 12, comprising:
    outputting the plain text result set to a client that provided the range query.

14. A computer program product comprising a non-transitory computer readable storage medium having program instructions embodied therewith, the program instructions executable by a device to cause the device to:
    separately encrypt a set of plain text data using two or more encryption functions, thereby producing an encrypted domain comprising at least two distinct groups of encrypted data items, wherein the two or more encryption functions comprise (i) a brute force safe function and (ii) a range safe function;
    convert a range query over plain text data items into a query over at least one of the distinct groups of encrypted data items; and
    combine results from the query over the distinct groups of encrypted data items, thereby generating a final encrypted result to the range query.

15. The computer program product of claim 14, wherein the program instructions executable by a computing device further cause the computing device to:
    decrypt the final encrypted result, thereby generating a plain text result set.

16. The computer program product of claim 15, wherein the program instructions executable by a computing device further cause the computing device to:
    output the plain text result set to a client that provided the range query.

17. A system comprising:
    a memory; and
    at least one processor coupled to the memory and configured for:
        separately encrypting a set of plain text data using two or more encryption functions, thereby producing an encrypted domain comprising at least two distinct groups of encrypted data items, wherein the two or more encryption functions comprise (i) a brute force safe function and (ii) a range safe function;

converting a range query over plain text data items into a query over at least one of the distinct groups of encrypted data items; and combining results from the query over the distinct groups of encrypted data items, thereby generating a final encrypted result to the range query.

18. A computer-implemented method, comprising steps of:

separately encrypting a table of plain text data using (i) a range safe encryption function and (ii) a brute force safe encryption function, thereby producing an encrypted table comprising (a) one or more columns of a range safe view of encrypted data and (b) one or more columns of a brute force safe view of encrypted data;

storing each column of (i) range safe view of encrypted data and (ii) brute force safe view of encrypted data in a distinct table;

removing physical and/or value correlations between the distinct tables;

converting a range query from the plain text data into a query over at least one of the distinct tables; and combining results from the query over the distinct tables, thereby generating a final encrypted result to the range query;

wherein the steps are carried out by at least one computing device.

19. The computer-implemented method of claim 18, comprising:

decrypting the final encrypted result, thereby generating a plain text result set; and outputting the plain text result set to a client that provided the range query.

* * * * *